United States Patent [19]

Iwashita et al.

[11] Patent Number: 4,609,274

[45] Date of Patent: Sep. 2, 1986

[54] CAMERA WITH AN AUTOMATIC FOCUS CONTROL DEVICE

[75] Inventors: Tomonori Iwashita, Kanagawa; Yoshihiko Aihara, Tokyo, both of Japan

[73] Assignee: Canon Kabushiki Kaisha, Tokyo, Japan

[21] Appl. No.: 722,415

[22] Filed: Apr. 11, 1985

Related U.S. Application Data

[63] Continuation of Ser. No. 558,767, Dec. 6, 1983.

[30] Foreign Application Priority Data

Dec. 7, 1982 [JP]  Japan ................................. 57-214401
Dec. 7, 1982 [JP]  Japan ................................. 57-214402
Dec. 7, 1982 [JP]  Japan ................................. 57-214403
Dec. 7, 1982 [JP]  Japan ................................. 57-214404

[51] Int. Cl.[4] ............................................. G03B 3/00
[52] U.S. Cl. ................................. 354/400; 354/442; 354/445; 354/267.1

[58] Field of Search .................. 354/400–409, 354/412, 441, 442, 444, 445, 267.1; 352/140

[56] References Cited

U.S. PATENT DOCUMENTS 4,508,443  4/1985  Matsuzaki et al. .................. 354/402

Primary Examiner—Russell E. Adams
Attorney, Agent, or Firm—Toren, McGeady, Stanger, Goldberg & Kiel

[57] ABSTRACT

A camera of multi-mode versatility provided with an automatic focus control device operating with manual selection of servo and one-shot modes in combination with a coordinating system responsive to the setting of either the shutter speed priority or the shutter speed leading programmed automatic exposure mode for automatically operating the focus control device in the servo mode and responsive to setting either the aperture priority or the aperture leading programmed automatic exposure mode for operating the focus control device in the one-shot mode.

7 Claims, 3 Drawing Figures

CAMERA WITH AN AUTOMATIC FOCUS CONTROL DEVICE

This application is a continuation of 558,767 filed 12/6/83.

BACKGROUND OF THE INVENTION

1. Field of the Invention

This invention relates to a camera having automatic exposure control functions with automatic focusing functions in optimum relationships.

2. Description of the Prior Art

There have been many previous proposals for different versatile automatic exposure modes (hereinafter referred to as "AE" modes) in a single camera, and a wide variety of cameras having such multi-mode versatility are now available. The AE modes heretofore used in the art may be broadly divided into three categories called a shutter speed priority automatic exposure mode (hereinafter referred to as ("Tv-AE"), an aperture priority automatic exposure mode ("Av-AE") and a programmed automatic exposure mode ("P-AE"). Of these three typical modes, the selection of Tv-AE allows the photographer to preset a desired shutter speed in accordance with which an aperture value is automatically determined. Therefore, it is suited for shooting a fast-moving object, for example, in sport photography. Alternatively, when in Av-AE, for any aperture value the photographer presets, the camera sets a corresponding shutter speed, as it is often used in portraits or other still-life photography. The P-AE, on the other hand, automatically sets both shutter speeds and apertures. Strictly speaking, however, there are roughly two ways in which the combinations of shutter speeds and apertures are programmed. One method is that as the object brightness changes, the shutter speed changes at a smaller rate than that at which the aperture changes. This may be called a shutter speed leading programmed automatic exposure mode (hereinafter referred to as "Tv-P-AE"). With the other method, the aperture changes at a smaller rate than that at which the shutter speed changes. This may be called an aperture leading programmed automatic exposure mode ("Av-P-AE"). Similar to the above-described Tv-AE and Av-AE, the Tv-leading and Av-leading aspects of the P-AE are respectively suited for in-action and at-rest photography.

Since automatic focusing control capability has recently been developed and auto-focus cameras have appeared on the market, an increasing number of automatic focusing control systems (hereinafter referred to as "AF" systems) are proposed. These AF systems operate, broadly speaking, in a servo mode, or in a one-shot mode. The servo mode is when the AF system is always in operation focusing the camera sharply on an object in spite of the moving object. In other words, after the in-focus condition has once been established when the object changes its position, the AF system moves the photographic objective again until the image of the object in the new position is sharply focused. As long as the object lies in the target area for the camera range finder, the in-focus condition is always retained. Accordingly, the servo mode is suited for use in shooting a moving object. Another or one-shot mode is such that as the photographic objective moves effecting focusing on shorter object distances, when an in-focus condition is detected, the AF system arrests the objective and despite the object distance is later changed denying readjustment of the object position. The user of this mode allows the photographer to make compositions with the subject of principal interest taking its place outside the range finding spot, which is generally positioned at the center of the entire picture frame. Therefore, the one-shot mode is suited for portraits, landscapes, or other still-life photographs.

Although two automatic focusing modes are known as described above, all the commercially available autofocus cameras have only one mode. A camera operating with the selection of two modes, namely, a servo mode and a one-shot mode, may be considered. Since, in this situation, however, a mode selector is necessary, such an AF system is installed in a camera of multi-exposure mode versatility. Some means must be provided for automatically selecting either the servo or the one-shot mode depending on the preselected automatic exposure mode or Tv-AE, Av-AE, Tv-P-AE and Av-P-AE. Otherwise, camera management becomes very troublesome.

An object of the present invention is to provide a camera having a multi-exposure mode and a multi-focusing mode and a multi-focusing mode versatility with automatic means making it possible, upon preselection of one of the exposure modes which is suited to shoot a moving object to set the AF system in the corresponding focusing mode. Upon preselection of one of the automatic exposure modes, which is suited to shoot an object at a standstill, the AF system is also set in the other mode. Thereby, the manageability of the camera is greatly improved.

SUMMARY OF THE INVENTION

This and other objects of the invention are attained in a camera including exposure control means for carrying out at least a shutter speed priority exposure control mode and a shutter speed leading programmed exposure control mode, focusing control means for carrying out at least a servo type focusing control mode and a one-shot type focusing control mode. A first mode setting means is operatively connected to the focusing control means for automatically setting the focusing control means in the servo type focusing control mode when the automatic exposure control means carries out the shutter speed priority exposure control mode or the shutter speed leading programmed exposure control mode.

DESCRIPTION OF THE PREFERRED EMBODIMENT

Figure 1:
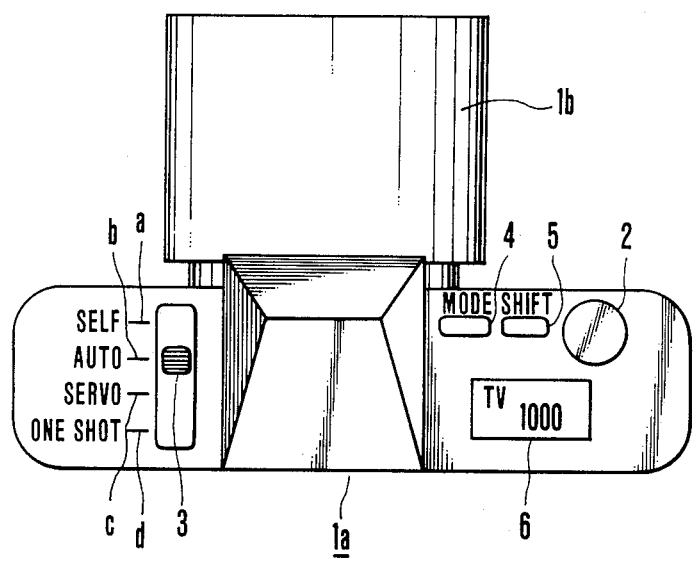
FIG. 1 is a to view of an embodiment of a camera according to the present invention.

FIG. 1 illustrates the outer appearance of a camera of the invention where reference symbol 1a identifies a camera body and reference symbol 1b identifies a lens barrel. A focusing mode selector 3 in the form of a slider knob has four switched positions a, b, c and d, respectively labelled SELF, AUTO, SERVO and ONE-SHOT. In the SELF position, a self-timer is rendered operative, the one-shot mode is set and a desired AE mode may be set. In the AUTO position, the corresponding AF mode to the present AE mode is automatically set. That is, responsive to presetting of Tv-AE or Tv-P-AE, the camera sets a limiter-on servo mode. Responsive to presetting of Av-AE or Av-P-AE, the camera sets the one-shot mode. For manually setting a limiter-off servo mode, the operator moves the mode selector 3 into registry with an index mark labeled SERVO. For the one-shot mode, the mode selector 3 is registered with another index mark labelled ONE-SHOT. An exposure mode selector or button 4 when pushed down selectively renders all the automatic exposure modes, namely, Tv-AE, Av-AE, Tv-P-AE, and Av-P-AE at a time in a display window 6. A shift button 5, when pushed down, renders the shutter speed or the aperture display to successively shift speed values or f/stops respectively in the window 6. The display window 6 is made from, for example, liquid crystal. A release button 2 has a two-stop stroke. In the first step, a switch SW7 (to be described later) is turned on, and in the second step, another switch SW3 is turned on. Thereby, a camera release is actuated.

The electrical circuitry of such a camera will now be described by reference to FIG. 2. A switch SW1 is turned on when the button 4 of FIG. 1 is pushed down. Reference numeral 7 identifies a pulse generator; reference numeral 9 identifies a negative edge triggered one-shot multivibrator responsive to closure of the switch SW1 for producing one pulse. A counter 8 has its CLK input terminal receptive to a train of clock pulses from the pulse generator 7 and when it has counted a predetermined number of pulses, its output is changed from low level (hereinafter referred to AS "L" level) to high level (hereinafter as "H" level) at a terminal Q thereof. The counter 8 has another input or reset (R) which is connected to the switch SW1 so that when the switch SW1 is OFF, the counter 8 is idle, and when ON, it is in operation. Reference numeral 10 identifies on OR gate. Four D type flip-flops 11 to 14 have their CLK input terminals connected to the common output of the OR gate 10, and another input terminal D, and have output terminals Q. When H level is applied to a P (preset) terminal of the first flip-flop 11, its Q terminal level becomes H. When H level is applied to C (clear) terminals of the flip-flops 12 to 14, their Q terminal levels becomes L. A power-on clear circuit 15 responsive to current supplied from an electrical power source or battery (not shown) produces an output pulse of short duration, which is then applied to the P terminal of the flip flop F.F. 11 and to the C terminals of flip-flops F.F.s 12 to 14. A shift switch SW2 is turned on when the shift button 5 of FIG. 1 is pushed down. A negative edge triggered one-shot multivibrator 16 responsive to closure of the switch SW2 produces one pulse. Another counter 17, similar to the first counter 8, receptive to clock pulses from the pulse generator 7 at its CLK input terminal and responsive to attainment of the counting number of pulses to a predetermined value, changes its output level from L to H at a Q terminal thereof. Connected to a reset (R) input terminal of the counter 17 is the switch SW2 so that when the switch SW2 is ON, the counter 17 is counting. Another group of ten D type flip-flops (of which the first four 19 to 22 and the last 23 are shown) have their CLK input terminals connected to an output of an OR gate 18, and another having input terminals D and output terminals Q. When the H level is applied to a preset (P) input terminal of the third flip-flop F.F.21, its Q output level becomes H. Also, when the H level is applied to C (clear) terminals of the other flip-flops F.F.s, their Q output levels become L. Applied to the P terminal of the flip-flop F.F. 21 and the C terminals of the other flip-flops F.F.s19 to 23 except 21 is, similarly, the pulse from the power-on clear circuit 15. An OR gate 24 has an output which is connected to a CE input terminal of a decoder 25 for the display device 6 of FIG. 1. Connected to another Tv/Av of decoder 25 is the Q output terminal of the flip-flop F.F. 11 in the first group. The decoder 25 operates only when the input level on the CE terminal is of H level. Also, when the input level on the Tv/Av terminal is of H level, it decodes shutter speeds. When of L level, it decodes apertures. The decoded value is displayed in the window 6. Reference numeral 26 identifies a light metering circuit; 27 a Tv-AE computer circuit; 28 an Av-AE computer circuit; 29 a Tv-P-AE computer circuit; and 30 an Av-P-AE computer circuit. These computer circuits 27 to 30 each have a CE input terminal and operate only when the input level on the CE terminal is of H level. An Av control circuit and a Tv control circuit respectively control the operations of a diaphragm (not shown) and a shutter (not shown) in accordance with the output of the decoder 25 or the outputs of the computer circuits 27 to 30.

A third counter 33 is, similar to the counter 8, receptive to the clock pulses from the pulse generator 7 at a CLK terminal thereof and responsive to change of the input on a reset terminal R thereof to L level for producing an output terminal of H level at a Q terminal thereof after a time necessary for the self-timer (for example, 10 seconds) has elapsed. A frequency divider 33a, receptive to the clock pulses from the pulse generator 7, produces a pulse of a duration necessary to activate a release control magnet Mg1 (for example, 10 milliseconds) at an output terminal T thereof. The switch SW3 is turned on when the release button 2 is depressed twice as described in connection with FIG. 1. An assembly of three switch elements SW4, SW5 and SW6 has four throws, a, b, c and d, with a single pole cooperating with the focusing mode selector 3 of FIG. 1. Connected to two inputs of an OR gate 34 are respectively the switch SW3 and the "a" contact of the switch SW4. The output of the OR gate 34 is connected to the R terminal of the third counter 33. An AND gate 35 has two inputs, one which is connected through an inverter 36 to the switch SW3, and the other which is connected to the "a" contact of the switch SW4. An OR gate 37 has two inputs, one which is connected to the output Q of the counter 33 and the other which is connected to the output of the AND gate 35. A D type flip-flop 38 has two input terminals CLK and D which are respectively connected to the output terminal T of the frequency divider 33a and the output of the OR gate 37. An AND gate 39 has two inputs which are connected to the output of the OR gate 37 and the output $\overline{Q}$ of the flip-flop F.F. 38, and has an output which is connected to the release control magnet Mg1. When the Mg1 is energized, a release mechanism (not shown) releases the shutter. An OR gate 40 has two inputs which are respectively connected to the outputs Q of the flip-flops F.F.s 11 and 13, and has an output which is connected to the "b" contact of the switch element SW6. The "a" and "d" contacts the switch element SW6 are connected to circuit earth. Reference numerals identify respectively 41 and 41a as OR gates; 42 and 43 analog switches; 44 and 45 operational amplifiers; 46 an inverter; and 47 an electric motor for driving a lens with power supplied from the operational amplifier 45. The output shaft of the motor 47 is drivingly connected to a gear 48; a lens optical system 49 is driven axially by the gear 48; a range finding circuit 50 produces an output in the form of a voltage proportional to the object distance; an in-focus discriminating circuit 51 compares the output of the range finding circuit 50 with the output of a variable resistor R1 of which a slider moves along with the lens system 49 upon in-focus detection of the lens system 49 producing an output level H. An in-focus display circuit 52 responsive to the output level H from the discriminating circuit 51, presents an in-focus display within the field of view of a finder. An SR flip-flop 53 has a set (S) input which is connected to the output of the in-focus discriminating circuit 51. Reference symbol SW7 identifies an AF reset switch. When OFF, a reset (R) input terminal of the SR F.F. 53 is always supplied with an H level signal and, therefore, a Q output of the flip-flop F.F. 53 is L level.

Figure 2:
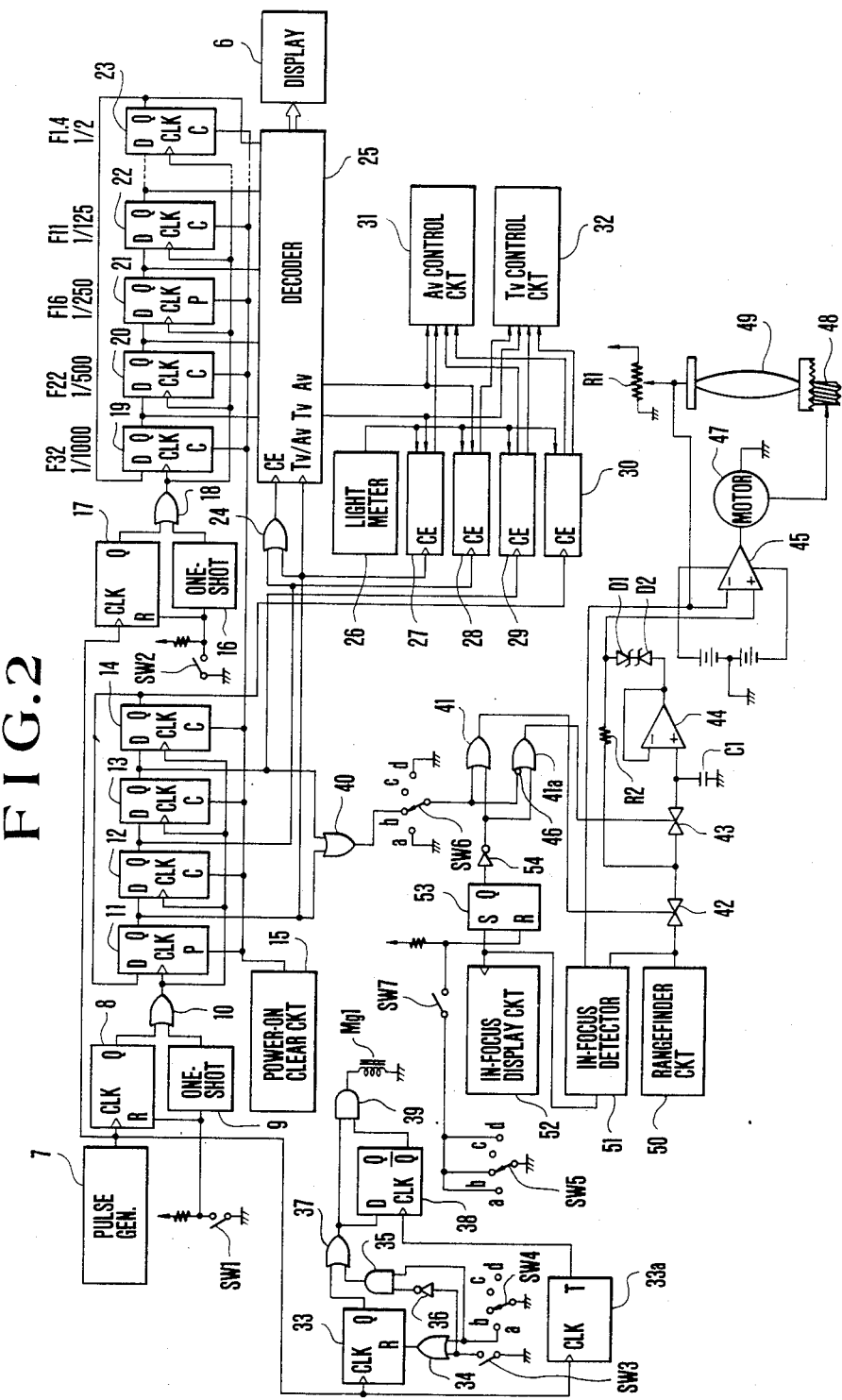
FIG. 2 is an electrical circuit diagram of the camera of FIG. 1.

The operation of the circuit of FIG. 2 is as follows:

When the battery of the camera is thrown by a switch (now shown), the power-on clear circuit 15 produces one H level pulse for a short time, which is applied to the P terminals of the D-F.F.s 11 and 21 and the C terminals of the other D-F.F.s in the first and second groups. Thereby, the Q outputs of the D-F.F.s 11 and 21 are set at H level, and the Q outputs of the other D-F.F.s 12 to 14, 19, 20, 22 and 23 at L level, as long as either the switch SW1 or the switch SW2 is not turned on. Then, when the exposure mode selector switch SW1 is turned off and on once, the multi-vibrator 9 produces a one-shot pulse which is applied through the OR gate 10 to all the D-F.F.s 11 to 14 in the first group at their CLK terminals. In synchronization with the rising edge of that pulse, the flip-flop F.F. 11 changes its Q output to L level, and the flip-flop F.F. 12 changes its Q output to H level, while the Q outputs of the flip-flops F.F.s 13 and 14 remain at L level. In other words, H level is moved from the output terminal of the flip-flop F.F. 11 to that of the flip-flop F.F. 12. In the second place, when the OFF-to-ON operation of the switch SW1 is recycled, the multi-vibrator 9 produces a second one-shot pulse, causing the Q output of H level to move from the flip-flop F.F. 12 to the flip-flop F.F. 13. Similarly, each time the switch SW1 is turned on, the Q outputs of all the flip-flops F.F.s 11 to 14 in the first group are successively changed to H level, as if only one flip-flop F.F. output which is always H level were moved from the place 11 to the place 14 and therefrom to the place 11 and then again to the place 14, and so on.

Since the R (reset) terminal of the counter 8 is connected to the switch SW1, as long as the switch SW1 is OFF, the Q output of the counter 8 remains at L level. This situation will otherwise also occur when the ON-and-OFF cycle of the switch SW1 takes a short time, because counting by the counter 8, which begins when the switch SW1 is turned on, is terminated before the Q output of the counter 8 changes to an H level.

With the switch SW1 closed for more than a predetermined time, however, as the pulse counting operation of the counter 8 advances, its Q output is repeatedly changed between H and L levels within a certain period. Since the Q output of the counter 8 is connected to the inputs CLK of all the flip-flops F.F.s 11 to 14, the H level of the Q output similarly shifts as do the flip-flops F.F.s 11 to 14. As soon as the switch SW1 is turned off, the counter 8 is reset, and one of the flip-flops F.F.s 11 to 14 which concurrently produces the H level Q output determines what automatic exposure mode is set in the camera.

Then, when the shift switch SW2 is once turned on, the one-shot multi-vibrator 16 produces one pulse of short duration which is then applied through the OR gate 18 changing the Q outputs of the D-F.F.s 21 and 22 to L and H levels respectively, while the Q outputs of the other F.F.s in the second group are unchanged from L level. After that, each time the shift switch SW2 is turned on, the Q output successively shifts from the flip-flop F.F. 22 reaching the last flip-flop F.F. 23 and therefrom to the flip-flop F.F. 19 and so on. With the shift switch SW2 closed for a long time, the counter 17 is allowed to shift the H level Q output successively across the flip-flop F.F.s 19 to 23 in the second group.

Returning to the beginning where the battery was thrown, of the D-F.F.s 11 to 14, only the Q output of the flip-flop F.F. 11 becomes H level, thereby the Tv-AE computer circuit is rendered operative. This Q output of the flip-flop F.F. 11 is routed through the OR gate 24 to a chip select input terminal (hereinafter referred to as "CE" input terminal) of the decoder 25 and also to the Tv/Av selection terminal thereof. Response to the H level output Q from the flip-flop F.F. 21, therefore, the decoder 25 displays a symbol "Tv", standing for the shutter speed priority along with a value of shutter speed, in this instance, 1/250 sec. for Tv=8, in the window 6 of FIG. 1. The decoder 25 also produces another output representing V=8, which is applied to the Tv control circuit 32, whereby the period of actuation of the shutter is adjusted to 1/250 sec. The Tv-priority exposure value computer 27 combines the preset shutter speed value, or 1/250 sec. with the light value from the light metering circuit 26 to produce an output representing a proper exposure value, in this instance, an aperture value which is applied to the Av control circuit 31.

For Tv=10 (1/1000 sec.), the Q output of F.F. 19 shall become H level; for Tv=9 (1/500 sec.), that of F.F. 20 shall become H level; for Tv=8 (1/250 sec.), that of F.F. 21 shall become H level; for Tv=7 (1/125 sec.), that of F.F. 22 shall become H level; for Tv=1 (½ sec.) the Q output of the last F.F. 23 shall become H level. Accordingly, if the photographer wants to change the preset value, he needs only to push the shift button 5 until the desired one appears in the window 6.

Next, if the photographer wants to change the exposure mode from the shutter speed priority to the aperture priority, he needs to push the button 4, whereby the H level Q output is shifted from the F.F. 11 to the F.F. 12. Responsive to the Q output of the F.F. 12, the Av-AE computer 28 is selectively rendered operative. The Q output of the F.F. 12 is also routed through the OR gate 24 to the CE terminal of the decoder 25. Responsive to the H level Q output from the F.F. 21, the decoder 25 causes another display of a symbol "Av" along with an aperture value, in this instance, F/16 for Av=8 to appear in the window 6, and produces an output representing Av=8 at an Av-labelled terminal which is applied to the Av control circuit 31 and also to the Av-priority exposure value computer 28. The size of the aperture opening of the diaphragm blades (not shown) is, at this time, adjusted to an F/16 stop by the Av control circuit 31. The computer 28 combines the preset aperture value Av=8 (F/16) with the output of the light metering circuit 26 to produce an output representing a corresponding shutter speed which is applied to the Tv control circuit 32.

For Av=10 (F/32), the Q output of the F.F. 19 shall become H level; for Av=9 (F/22), the F.F. 20 shall do; for Av=8 (F/16), the F.F. 21 shall do; for Av=7 (F/11), the F.F. 22 shall do; for Av=1 (F/1.4) the F.F. 23 shall do. Accordingly, if the photographer wants to change the preset value from F/16, as has been described in connection with the Tv-priority mode, he needs to push the shift button 5 until the desired one appears in the window 6.

Figure 3:
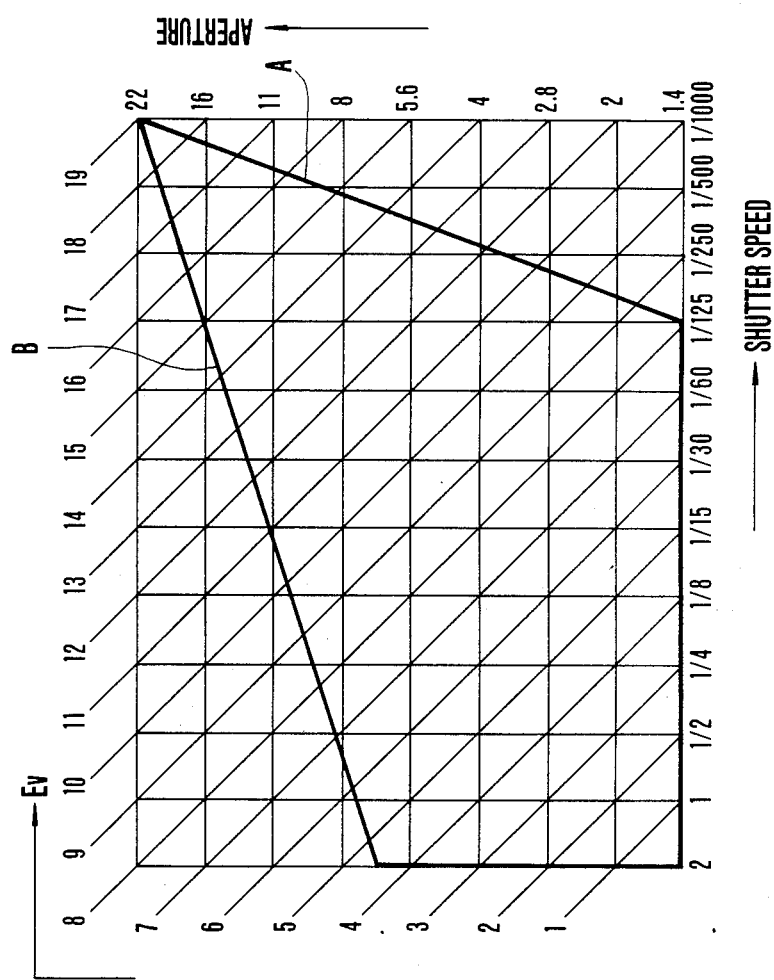
FIG. 3 is a graph illustrating program lines in which the programmed automatic exposure mode of the camera of FIGS. 1 and 2 operates.

As the H level of the Q output is further shifted from the F.F. 12 to the F.F. 13 by the mode selector switch SW1, the Tv-P-AE computer 29 is selectively rendered operative. Referring now to FIG. 3, as the light value in Ev increases, the Tv-P-AE computer 29 sets rapidly increasing shutter speeds until it reaches 1/125 sec., while maintaining the aperture at a constant value of F/1.4 as indicated at a program line A, for example.

Upon further shifting of the H level Q output from the F.F. 13 to the F.F. 14, the Av-P-AE computer 30 is selectively rendered operative. As shown by a program line B in FIG. 3, the Av-P-AE computer 30 sets apertures increasing at a greater rate in terms of the f-number than the rate at which the shutter speeds which it also sets increase, as the light value increases.

Thus, the AE modes, namely, Tv-AE, Av-AE, Tv-P-AE and Av-P-AE, can each be selectively set by operating the mode switch SW1. Also, when in Tv-AE and Av-AE modes, any shutter speed or aperture value can be preset by operating the shift switch SW2.

Next, the automatic focusing aspect of the camera is described. Now assuming that the camera operates in Tv-AE or Tv-P-Ae mode (hereinafter called a "first case"), then when the focusing mode selector or slide know 3 is placed in registry with the "AUTO" mark, the switch elements SW4, SW5 and SW6 take their "b" positions. Before the release button (FIG. 1) is not pushed down, the switch SW7 is open, giving an H level signal to the reset terminal R of SR-F.F. 53. Responsive to the L level Q output from the SR-F.F. 53, the inverter 54 produces an H level output, which is then applied through the OR gates 41 and 41a to the gating control terminals of the analog switches 42 and 43. Therefore, the analog switches 42 and 43 are rendered conducting, passing the output of the range finding circuit 50 therethrough to a non-inversion input terminal of the operational amplifier 45. As the OP amplifier 45 produces its output in the form of a positive voltage, the lens system 49 is driven to the right by the motor 47. Since the output of the variable resistor R1 is applied to an inversion input terminal of the OP amplifier 45, as the lens system 49 moves to the right, when the voltages appearing at the two input terminals of the OP amplifier 45 become equal, neither the positive voltage nor a negative voltage appears at the output of the OP amplifier 45. Thus, the lens system 49 is stopped from further rightward movement whereby a sharp image of an object to be photographed is formed on a film plane.

As the object distance is later changed, the output voltage of the range finding circuit 50 changes. When the voltage at the non-inversion input terminal of the OP amplifier 45 becomes lower than at the inversion input terminal, the OP amplifier 45 produces an output in the form of a negative voltage. Response to this, the motor 47 moves the lens system 49 to the left. Also, when the voltages at the two inputs of the OP amplifier 45 become equal, the lens system 49 stops. As long as the switch SW3 is OFF, the lens system 49 always carries out servo operation, focusing a sharp image on the film plane.

Then when the release button 2 (see FIG. 1) is depressed once, the switch SW7 is turned on. Since the selector switch element SW5 is in its "b" position, the reset terminal of the SR-F.F. 53 is supplied with an L signal. Now the selector knob 3 (FIG. 1) is in the AUTO position, and Tv-AE or Tv-P-AE is in operation. Therefore, the outputs of the OR gates 40 and 41 are always at an H level. Then, when the in-focus condition is reached after the switch SW7 has been turned on, the in-focus detecting circuit 51 produces an H level output which is applied to set the SR-F.F. 53. Responsive to the H level output from the SR-F.F. 53, the inverter 54 produces an L level output which is applied to the OR gates 41 and 41a. At this time, the OR gate 41 produces an L output, causing the analog switch 43 to be rendered non-conducting. Therefore, applied to the non-inversion input terminal of the operational amplifier 44 is a voltage proportional to the object distance measured at the time when it is in focus from a condenser C1. On the other hand, the analog switch 42 still conducts, so that after the in-focus condition is reached, the rangefinder circuit 50 continues to produce output voltages proportional to object distances. Letting reference symbol $V_C$ identify the voltage stored on the condenser C1 and proportional to the object distance measured at the time when in focus, $V_M$ the output voltage of rangefinder circuit 50, and $V_Z$ the Zener voltage of diodes D1 and D2, when $V_M - V_C > V_Z$, it is by the Zener effect of diode D1 that a voltage of $V_C + V_Z$ is applied to the non-inversion input terminal of the OP amplifier 45 and it is no longer exceeded upward.

When $V_C - V_M > V_Z$, it is by the Zener effect of diode D2 that a voltage of $V_C - V_Z$ is applied to the non-inversion input terminal of the OP amplifier 45 and is no longer exceeded downward.

When $-V_Z \leq V_M - V_C \leq V_Z$, both the diodes D1 and D2 no longer have the Zener effect, so that the output voltage $V_M$ from the rangefinder circuit 50 is applied to the non-inversion input terminal of the OP amplifier 45 as it is.

It is to be understood that for a voltage far greater than the voltage produced when in-focus is produced, it is suppressed within the limits of Zener voltage, and that after the in-focus condition has once been established, as the servo AF continues to operate, when the object distance changes greatly, a limiter is laid.

Then, when the release button 2 is depressed with a second stroke, the switch SW3 is turned on. Since, at this time, the selector switch element SW4 is in its "b" position, the input of the OR gate 34 is of an H level. Therefore, the output of that OR gate 34 is also of an H level so that the counter 33 is always in reset. Therefore, the Q output is L level. Also responsive to closure of the switch SW3, the inverter 36 produces an H level output which is applied to the AND gate 35. Also, since the "a" terminal of the switch SW4 is also at an H level, the output of the AND gate 35 becomes H level. Also, the F.F. 38 produces an H level $\bar{Q}$ output for a time (for example, 10 milliseconds) determined by the frequency divider 33b. Therefore, the output of the AND gate 39 becomes H level for that time after closure of the switch SW3, thereby the release control magnet Mg1 is energized. Thus, the shutter is released without the use of the self-timer.

Alternatively, assuming that the camera operates in the Av-AE or the Av-P-AE mode (hereinafter called a "second case"), then when the focusing mode selector or the switch elements SW4, SW5 and SW6 remain in their "b" or AUTO positions, an AF operation similar to that described in connection with the first instance takes place, provided that the release button 2 is not depressed. Then, when the release button is depressed a first stroke, the switch SW7 is turned on. Since the selector switch SW5 is in "b" position, an L signal is applied to the reset terminal of the SR-F.F. 53. Since, at this time, the Av-AE or the Av-P-AE is in operation, the output of the OR gate 40 is of an L level which, after having been inverted by the inverter 46, is applied to the OR gate 41a. Therefore, the output of the OR gate 41a is maintained at an H level. In this situation, after the switch SW7 has been turned on, when the in-focus condition is detected, the circuit 51 produces an H level output which sets the SR-F.F. 53. Responsive to the H level Q output from the SR-F.F. 53, the inverter 54 produces an L level output which is then applied to the OR gate 41. Since, at this time, the output of the OR gate 40 is also L level, the OR gate 41 produces an L level output, thereby the analog switch 42 is rendered non-conducting. After that, the output from the range-finder circuit 50 is cut off, and the non-inversion input terminal of the OP amplifier 45 is supplied with a voltage proportional to the object distance measured at the time when the in-focus condition is detected and stored on the condenser C1. It is to be understood that after the release button 2 was depressed to turn on the switch SW7 and the in-focus condition has once been detected, the position that the lens system 49 has taken at the time when the in-focus condition has been reached is no longer changed, so that the lens system 49 remains stationary in a certain position. In other words, the automatic focusing device has operated in the one-shot mode.

Then, when the release button 2 is depressed a second stroke, the switch SW3 is turned on. Since, at this time, the selector switch SW4 is in its "b" position, a similar subsequent procedure to that described above will take place, releasing the shutter.

Next, the servo mode will be described. For this mode, the operator needs to move the selector knob 3 into its "c" position. Since, in this situation, the switch SW6 is in the "c" position, the presetting of the AE mode does not influence what AF mode is to be set. If the release button 2 is not depressed, similar to the first situation, the AF device operates in the limiter-off servo mode. In this case, even when the release button 2 is depressed, a first stroke to turn on the switch SW7, because the selector switch SW5 is in the "c" position, the reset terminal of the SR-F.F. 53 remains at H level. Therefore, the AF device is operating in the servo mode, leaving the limiter inoperative. Then, when the release button 2 is further depressed, the switch SW3 is turned on by its second stroke. Since, at this time, the switch SW4 is in the "c" position, the input of the OR gate 34 is of H level. Therefore, a subsequent procedure operates in a similar manner to that described in connection with the first case, releasing the shutter.

For the one-shot mode, the operator needs to place the selector knob 3 in registry with a mark indicated at "d". Since, in this case, the switch SW6 is in the "d" position, the presetting of the AE mode does not determine what AF mode is to be set. Also, since the "d" contact of the switch SW6 is grounded, the switch SW6 is always L level, causing the OR gate 40 to produce an L level output. Therefore, the AF device operates in a manner similar to that described in connection with the second case. That is, the one-shot mode is set. Also, since the switch SW4 is in the "d" position, the output of the OR gate 34 is of H level, causing a release operation to proceed, similar to that described in connection with the first case.

Next, the "a" or SELF position of the knob 3 is explained. Since, in this case, the SW6 is in its "a" position, selection of the AF modes is effected independent from the preset AE mode. Also, since the "a" contact of the switch SW6 is grounded, the switch SW6 is always L level, and the output of the OR gate 40 is L level. Therefore, the AF device operates in a manner similar to that described in connection with the second case. That is, the selected AF mode is the one-shot mode. Also, since the switch SW4 is in the "a" position, closure of the switch SW3 by the second stroke of the release button 2 causes the OR gate 34 to produce an L level output. Then, the counter 33 is reset and starts counting clock pulses from the generator 7. In a predetermined time (for example, 10 seconds), such as the actuation period of a self-timer, counter 33 changes its Q output to H level. Then the output level of the OR gate 37 becomes H level. On the other hand, the F.F. 38 produces the $\overline{Q}$ output of H level for the time (for example, 10 milliseconds) determined by the frequency divider 33a. Therefore, the AND gate 39 changes its output to H level when the period of actuation of the self-timer is terminated and maintains it as H level for that frequency-divided time, causing the release control magnet Mg1 to be energized. Thus, the shutter is released with the use of the self-timer.

As has been described in greater detail above, according to the present invention, for automatic selection of a proper AF mode, it is only necessary for the photographer to put the selector knob in "AUTO" position. When the photographer sets the Tv-AE or the Tv-P-AE mode, the camera then sets the servo mode. Also, when he sets the Av-AE or the Av-P-AE mode, the camera then sets the one-shot mode. This produces the great advantage that even though a camera of multi-mode versatility is provided with the auto-focus device of two mode versatility, the management is so simple that the photographer only needs to manipulate the AE mode selector. In photographic situations where the above automatic combinations of the AE and AF modes are improper, the photographic can set a desired AF mode independent from the AE mode which has been preset.

It is to be noted that in the above embodiment, as soon as the battery is thrown, the AF device starts to operate. From an electrical energy conservation standpoint, it is, of course, possible to delay the current supply to the AF circuit until the release button is depressed once.

What we claim:
1. A camera comprising:
   (a) exposure control means for carrying out at least a shutter speed priority exposure control mode and a shutter speed leading programmed exposure control mode;
   (b) focusing control means for carrying out at least a servo type focusing control mode and a one-shot type focusing control mode; and

(c) first mode setting means operatively connected to said focusing control means to automatically set said focusing control means in said servo type focusing control mode when said automatic exposure control means carries out said shutter speed priority exposure control mode or said shutter speed leading programmed exposure control mode.

2. A camera according to claim 1, wherein said exposure control means further has at least an aperture priority exposure control mode and an aperture leading programmed mode, and further including second mode setting means for automatically setting said focusing control function in said one-shot type focusing control mode when said exposure control means is set to said aperture priority exposure control mode or said aperture leading programmed exposure control mode.

3. A camera comprising:
(a) exposure control means for carrying out at least an aperture priority exposure control mode and an aperture leading programmed exposure control mode;
(b) focusing control means for carrying out at least a one-shot type focusing control mode and a servo type focusing control mode; and (c) mode setting means operatively connected to said focusing control means to automatically set said focusing control means to said one-shot type focusing control mode when said exposure control means carries out said aperture priority exposure control mode or said aperture leading programmed exposure control mode.

4. A camera comprising:
(a) exposure control means for carrying out at least a shutter speed priority exposure control mode;
(b) focusing control means for carrying out at least a servo type focusing control mode and a one-shot type focusing control mode; and
(c) first mode setting means operatively connected to said focusing control means to automatically set said focusing control means to said servo type focusing control mode when said automatic exposure control means carries out said shutter speed priority exposure control mode.

5. A camera according to claim 4 wherein said exposure control means further has an aperture priority exposure control mode and an aperture leading programmed exposure control mode, and further including second mode setting means responsive to setting of said exposure control means to said aperture priority exposure control mode or said aperture leading programmed exposure control mode for automatically setting said focusing control function to said one-shot type focusing control mode.

6. A camera comprising:
(a) exposure control means for carrying out at least an aperture priority exposure control mode;
(b) focusing control means for carrying out at least a servo type focusing control mode and a one-shot type focusing control mode; and
(c) first mode setting means operatively connected to said focusing control means for automatically setting said focusing control means to said one-shot focusing control mode when said exposure control means carries out said aperture priority exposure control mode.

7. A camera including an automatic in-focus controlling device having at least a one-shot type in-focus control mode to enable self-timer photography, comprising:
(a) control means for performing said one-shot type in-focus control mode; and
(b) a member for setting a control mode of the automatic in-focus control device, said member being functionally connected to said control means to forcibly effectuate said control means when said self-timer photography is carried out.

* * * * *